US012607238B2

(12) United States Patent
van Booven et al.

(10) Patent No.: US 12,607,238 B2
(45) Date of Patent: Apr. 21, 2026

(54) DRUM BRAKE, BRAKE SYSTEM, AND VEHICLE

(71) Applicant: Vitesco Technologies GmbH, Regensburg (DE)

(72) Inventors: Benedikt van Booven, Regensburg (DE); Willibald Reitmeier, Hemau/Hohenschambach (DE); Bernhard Lehmayr, Regensburg (DE)

(73) Assignee: Vitesco Technologies GmbH, Regensburg (DE)

( * ) Notice: Subject to any disclaimer, the term of this patent is extended or adjusted under 35 U.S.C. 154(b) by 388 days.

(21) Appl. No.: 18/236,473

(22) Filed: Aug. 22, 2023

(65) Prior Publication Data

US 2024/0068533 A1 Feb. 29, 2024

(30) Foreign Application Priority Data

Aug. 23, 2022 (DE) .................. 10 2022 208 728.33

(51) Int. Cl.
| | |
|---|---|
| *F16D 51/20* | (2006.01) |
| *B60T 1/06* | (2006.01) |
| *B60T 17/22* | (2006.01) |
| *F16D 51/00* | (2006.01) |
| *F16D 66/00* | (2006.01) |

(52) U.S. Cl.
CPC .............. *F16D 51/20* (2013.01); *B60T 1/067* (2013.01); *B60T 17/22* (2013.01); *F16D 66/00* (2013.01); *F16D 2051/003* (2013.01)

(58) Field of Classification Search
CPC .... F16D 51/20; F16D 66/00; F16D 2066/005; F16D 2051/003; F16D 2051/001; F16D 51/00; B60T 17/22; B60T 8/171; B60T 1/067; B60T 8/52
See application file for complete search history.

(56) References Cited

U.S. PATENT DOCUMENTS

| | | | | | |
|---|---|---|---|---|---|
| 2,102,851 | A | * | 12/1937 | La Brie ................... | F16D 65/09 188/332 |
| 3,349,875 | A | * | 10/1967 | Stelzer .................... | F16D 51/52 188/78 |
| 3,668,445 | A | * | 6/1972 | Grove ..................... | F16D 55/00 188/138 |
| 4,020,454 | A | * | 4/1977 | Malonee ................. | F16D 66/00 200/61.4 |

(Continued)

FOREIGN PATENT DOCUMENTS

| | | |
|---|---|---|
| DE | 102013224 922 | 6/2015 |
| DE | 102017217 413 | 4/2019 |

(Continued)

OTHER PUBLICATIONS

Office Action of corresponding German Patent Application No. 10 2022 208 728.3.

*Primary Examiner* — Henry Y Liu
(74) *Attorney, Agent, or Firm* — COZEN O'CONNOR

(57) ABSTRACT

A drum brake with a carrier, a deformation sensor, and at least one brake shoe. The carrier is connected to a supporting bearing for the at least one brake shoe. The deformation sensor is designed to determine a deformation of the carrier. A brake system includes at least one such drum brake, and a vehicle with such a brake system or with at least one such drum brake.

13 Claims, 2 Drawing Sheets

(56) References Cited

U.S. PATENT DOCUMENTS

| | | | | |
|---|---|---|---|---|
| 4,172,242 | A * | 10/1979 | Myers | H01F 7/06 |
| | | | | 188/138 |
| 4,217,973 | A * | 8/1980 | Johns | F16D 66/02 |
| | | | | 188/1.11 R |
| 4,266,640 | A * | 5/1981 | Woo | F16D 51/24 |
| | | | | 188/363 |
| 4,615,419 | A * | 10/1986 | Gaiser | F16D 65/14 |
| | | | | 303/112 |
| 4,666,021 | A * | 5/1987 | Messersmith | F16D 51/48 |
| | | | | 477/194 |
| 4,790,606 | A | 12/1988 | Reinecke | |
| 4,850,459 | A * | 7/1989 | Johannesen | B60T 13/741 |
| | | | | 188/162 |
| 4,995,480 | A * | 2/1991 | Hazelden | B60T 17/22 |
| | | | | 340/453 |
| 5,079,947 | A * | 1/1992 | Feldmann | F16D 66/00 |
| | | | | 374/E3.003 |
| 5,099,967 | A * | 3/1992 | Lang | F16D 65/08 |
| | | | | 188/250 F |
| 5,189,391 | A * | 2/1993 | Feldmann | B60T 17/22 |
| | | | | 340/453 |
| 5,429,213 | A * | 7/1995 | Iizuka | F16D 65/58 |
| | | | | 188/79.52 |
| 5,443,132 | A * | 8/1995 | Arnold | B60T 13/741 |
| | | | | 188/164 |
| 5,484,044 | A * | 1/1996 | Bursteinas | B60T 7/122 |
| | | | | 188/DIG. 2 |
| 5,960,912 | A * | 10/1999 | Nishizawa | F16D 28/00 |
| | | | | 188/1.11 E |
| 5,979,613 | A * | 11/1999 | Towers | F16D 66/00 |
| | | | | 188/327 |
| 6,131,708 | A * | 10/2000 | Fujiwara | F16D 65/0006 |
| | | | | 188/205 A |
| 6,176,352 | B1 * | 1/2001 | Maron | G01L 5/225 |
| | | | | 188/72.1 |
| 6,328,141 | B1 * | 12/2001 | Asai | F16D 51/20 |
| | | | | 188/79.54 |
| 6,345,708 | B1 * | 2/2002 | Fujiwara | F16D 51/20 |
| | | | | 188/341 |
| 6,390,248 | B1 * | 5/2002 | Ikeda | F16D 51/24 |
| | | | | 188/79.61 |
| 6,499,569 | B1 * | 12/2002 | Beggs | F16D 65/0006 |
| | | | | 188/250 F |
| 6,550,589 | B1 * | 4/2003 | Pomponio, Sr. | F16D 65/42 |
| | | | | 188/79.61 |
| 6,581,728 | B2 * | 6/2003 | Borugian | F16D 51/20 |
| | | | | 188/1.11 R |
| 6,615,624 | B2 * | 9/2003 | Cardwell | B60R 25/086 |
| | | | | 70/201 |
| 6,634,208 | B2 | 10/2003 | Salou et al. | |
| 7,114,596 | B2 * | 10/2006 | Borugian | F16D 51/20 |
| | | | | 188/1.11 R |
| 7,504,920 | B2 * | 3/2009 | Richeson | F16D 51/48 |
| | | | | 188/161 |
| 7,813,860 | B2 | 10/2010 | Horiuchi et al. | |
| 8,235,189 | B2 * | 8/2012 | Maehara | F16D 65/22 |
| | | | | 188/364 |
| 9,555,779 | B2 * | 1/2017 | Oshio | F16D 51/20 |
| 10,690,205 | B2 * | 6/2020 | Emmons | F16D 65/09 |
| 11,578,772 | B2 * | 2/2023 | von Hayn | F16D 65/04 |
| 11,994,186 | B2 * | 5/2024 | Adkins | F16D 66/024 |
| 12,000,446 | B2 * | 6/2024 | Gädke | F16D 65/22 |
| 12,228,179 | B2 * | 2/2025 | Bach | F16D 51/52 |
| 12,240,425 | B2 * | 3/2025 | Witte | B60T 1/067 |
| 12,404,907 | B2 * | 9/2025 | Han | F16D 49/16 |
| 2002/0104720 | A1 * | 8/2002 | Borugian | F16D 51/20 |
| | | | | 188/74 |
| 2003/0038002 | A1 * | 2/2003 | Kapaan | F16D 65/22 |
| | | | | 188/327 |
| 2003/0192747 | A1 * | 10/2003 | Borugian | F16D 51/20 |
| | | | | 188/1.11 E |
| 2007/0024113 | A1 | 2/2007 | Thrush | |
| 2007/0151818 | A1 * | 7/2007 | Linhoff | F16D 65/14 |
| | | | | 188/162 |
| 2008/0071457 | A1 * | 3/2008 | Shiraki | H02P 3/04 |
| | | | | 188/162 |
| 2010/0206677 | A1 * | 8/2010 | Shiraki | B60T 13/741 |
| | | | | 188/325 |
| 2014/0345989 | A1 * | 11/2014 | Oshio | B60T 13/741 |
| | | | | 188/162 |
| 2018/0355934 | A1 * | 12/2018 | Emmons | F16D 65/09 |
| 2020/0191218 | A1 * | 6/2020 | von Hayn | F16D 51/20 |
| 2022/0065310 | A1 * | 3/2022 | Bach | F16D 51/52 |
| 2022/0228635 | A1 * | 7/2022 | Gädke | B60T 8/171 |
| 2022/0234564 | A1 * | 7/2022 | Witte | B60T 1/067 |
| 2023/0193969 | A1 * | 6/2023 | Son | F16D 51/20 |
| | | | | 188/326 |
| 2023/0375059 | A1 * | 11/2023 | Han | F16D 49/16 |
| 2024/0068536 | A1 * | 2/2024 | Adkins | F16D 66/024 |
| 2024/0392852 | A1 * | 11/2024 | Biggins | F16D 66/027 |
| 2025/0153700 | A1 * | 5/2025 | Schulitz | F16D 65/22 |

FOREIGN PATENT DOCUMENTS

| | | |
|---|---|---|
| DE | 102018222125 | 4/2020 |
| DE | 102021120185 | 2/2023 |
| WO | WO 2020250199 | 12/2020 |
| WO | WO 2021130655 | 7/2021 |

* cited by examiner

DRUM BRAKE, BRAKE SYSTEM, AND VEHICLE

BACKGROUND OF INVENTION

1. Field of the Invention

The disclosure relates to a drum brake, a brake system, and a vehicle.

2. Description of Related Art

It is customary to calculate the braking force of a drum brake via the fluid pressure in a brake cylinder by a pressure sensor.

DE 10 2013 224 922 A1 discloses, in contrast, a drum brake with an electromechanical actuator and a brake shoe, wherein a sensor, by which the braking force can be determined, is arranged in the force flow between the actuator and the brake shoe.

DE 10 2017 217 413 A1 discloses a drum brake with a brake shoe and a supporting bearing, wherein measurement of a supporting force generated in the supporting bearing by the brake shoe is enabled by a force sensor on the supporting bearing.

SUMMARY OF THE INVENTION

An object of one aspect of the present invention is to supply an alternative drum brake which is characterized in particular in that the braking force or the braking torque can be determined in a simple, cost-effective, and/or reliable manner A further object consists in supplying a brake system with such a drum brake. A further object moreover consists in supplying a vehicle with such a drum brake or such a brake system.

One aspect of the invention relates to a drum brake with a carrier, a deformation sensor, and at least one brake shoe, wherein the carrier is connected to a supporting bearing for the at least one brake shoe, wherein the deformation sensor is designed to determine a deformation of the carrier.

It is possible to determine the braking force or the braking torque of the drum brake simply, cost-effectively, and reliably during its actuation because the supporting force created during the braking procedure, imparted and transmitted to the supporting bearing by the at least one brake shoe, is transmitted from the supporting bearing to the carrier, which effects a deformation of the carrier which is proportional to the braking force or the braking torque. This happens because the at least one brake shoe is able to be supported on the supporting bearing during a braking procedure of the drum brake, as a result of which the supporting force consequently transmitted to the carrier causes a deformation of the carrier. In other words, it is preferred if the at least one brake shoe is arranged so that it is or can be supported on the supporting bearing.

It is advantageous if the carrier is produced from metal. In other words, in this case the carrier is made from metal. It is alternatively conceivable that the carrier is made at least predominantly from metal. This contributes to the durability and reliability of the carrier. The material or the metal from which the carrier is produced is preferably a ductile material, a ductile metal, or a ductile steel. In other words, it is a material, a metal, or a steel that can be deformed elastically under load. It is particularly preferred if it is a ferritic metal or a ferritic steel.

It is also advantageous if the carrier is dimensioned in such a way that the carrier undergoes only an elastic, in particular a linear elastic, deformation during the operation of the drum brake, in particular during a braking procedure. In other words, the carrier is dimensioned or designed in such a way that the carrier can be deformed exclusively elastically during operation by the forces of the drum brake which occur. In this way, failure of the carrier or long-lasting, i.e. permanent, deformation of the carrier from the original shape of the carrier is reliably avoided. It is moreover consequently ensured that braking force or braking torque measurements which are performed have a similar degree of accuracy. It is particularly expedient if the maximum occurring mechanical stress of the carrier, an intended deformation region which can be part of one of the embodiments, and/or a deformation sensor carrier which can be part of one of the embodiments corresponds during a braking procedure of the drum brake to no more than half, one third, one quarter, or one fifth of the upper yield point of the material of the carrier or the deformation sensor carrier. This is achieved by a corresponding dimensioning of the carrier, the intended deformation region of the carrier, and/or the deformation sensor carrier. As a result, hysteresis of the shape of the carrier or the deformation sensor carrier by the deformation which happens during the braking procedure is as far as possible avoided, which contributes to the measuring accuracy.

It is moreover preferred if the maximum occurring mechanical stress of the carrier, an intended deformation region which can be part of one of the embodiments, and/or a deformation sensor carrier which can be part of one of the embodiments corresponds during a braking procedure of the drum brake to at least three times, five times, or ten times the mechanical stress of the supporting bearing. This can be implemented by a suitable dimensioning, coordination, and/or arrangement of the supporting bearing and the carrier and/or the deformation sensor relative to each other. A relatively stiff supporting bearing and a desired deformation of the carrier during a braking procedure is ensured as a result.

It is moreover advantageous if the deformation sensor is a capacitive, inductive, piezoelectric, or resistive sensor. It is alternatively also advantageous if the deformation sensor is a sensor with one or more strain gauges or if is a surface acoustic wave (SAW) sensor. The deformation sensor is particularly preferably designed as part of a full bridge. Where the full bridge is arranged on a deformation sensor carrier, which is very much preferred, the deformation sensor is arranged obliquely, in particular at an angle of 45°, to the direction of extent of the deformation sensor carrier.

It is particularly advantageous if the drum brake comprises two brake shoes which are arranged in such a way that one of both of the brake shoes can be supported on the supporting bearing during a braking procedure. This option exists for all the embodiments mentioned above and below, where the type of the drum brake allows it.

It is moreover advantageous if the at least one brake shoe is or can be coupled directly and/or indirectly to the supporting bearing in a force-transmitting fashion. A force of the brake shoe, the so-called supporting force, can thus be transmitted to the carrier and from the carrier to the supporting bearing.

Each of the brake shoes preferably comprises a brake lining and/or each of the brake shoes is floating.

It is furthermore expedient if the carrier forms a force path or the sole force path from the at least one brake shoe and/or the supporting bearing to a periphery of the drum brake, for example a wheel carrier or a stub axle, to which the carrier is preferably connected or fastened. In other words, it is preferred if the supporting force of the at least one brake shoe can be transmitted from the supporting bearing to the periphery predominantly or solely, i.e. exclusively, by the force path formed by the carrier.

It is in principle preferred if the drum brake is a simplex brake, a duplex brake, a duo duplex brake, a servo brake, or a duo servo brake. As a result, it is possible for correspondingly suited drum brake types to be provided for different use areas or vehicles.

In principle, the drum brake according to one aspect of the invention is a drum brake for a motor vehicle. Independently thereof, it is in principle or additionally conceivable that the drum brake according to one aspect of the invention is a drum brake which can be actuated hydraulically and/or mechanically and/or electrically. Mechanical actuation can take the form of, for example, cables of a parking brake, a so-called hand brake. Electrical actuation can be effected, for example, by an electrical actuator. Such an electrical actuator is in such a case preferably integrated into the drum brake according to one aspect of the invention. The sensor serves preferably for operating, in particular regulating and/or controlling, the actuator and is thus preferably capable of supplying the requested or required braking torque by the drum brake.

It is furthermore particularly preferred if the braking force and/or the braking torque of the drum brake can be determined from the deformation, determined by the deformation sensor, of the carrier, the intended deformation region of the carrier, or the deformation sensor carrier. For this purpose, it is particularly preferred if the measurement signal of the deformation sensor can be evaluated by an evaluation unit in such a way that a braking force signal and/or a braking torque signal is or can be generated by the evaluation unit. Such an evaluation unit is preferably integrated into a control device. The evaluation unit and/or the control device are preferably supplied with the drum brake.

It is moreover expedient if the carrier is or can be connected to a periphery in a force-transmitting fashion. In this way, the braking force or the braking torque of the drum brake can be conducted to the carrier and from the carrier into the periphery, or can be supported on the periphery, by the supporting bearing. The periphery is preferably part of a vehicle or motor vehicle, for example a stub axle or a wheel carrier.

One of the preceding exemplary embodiments or a further one is preferably characterized in that the carrier can be connected to a stub axle or is designed as integral with a stub axle. It is alternatively conceivable that the carrier can be connected to a wheel carrier or is designed as integral with a wheel carrier. In other words, the stub axle or the wheel carrier forms the periphery. The connection of the carrier to the stub axle or the wheel carrier is in particular a fastening. In this way, supporting forces which occur can be supported during a braking procedure. The connection is preferably a screw connection. By virtue of an integral design, there is no need for additional mounting steps and additional manufacturing costs.

It is generally expedient if the supporting bearing is subject to a shear force by the at least one brake shoe during the braking procedure of the drum brake. The force introduction point is expediently situated between the at least one brake shoe and the supporting bearing on the lateral outer contour of the supporting bearing.

A preferred exemplary embodiment is characterized in that the carrier and the supporting bearing are formed separately from each other. As a result, it is possible to perform the manufacturing process of the supporting bearing and the manufacturing process of the carrier separately from each other, which can simplify production. Numerous independent possibilities and degrees of freedom as to how the carrier can be formed independently of the supporting bearing are also made possible as a result.

The connection between the carrier and the supporting bearing is preferably a fastening. It is also preferred if the supporting bearing is connected or fastened to the carrier in a form-fitting, force-fitting, and/or materially bonded fashion. It is, for example, conceivable that the supporting bearing is connected to the carrier by a screw connection or a rivet connection. It is particularly preferred if the supporting bearing is connected replaceably to the carrier. In other words, it is preferred that the connection between the carrier and the supporting bearing is connected or fastened detachably, for example by a screw connection. It is moreover advantageous if connecting elements or fastening elements, for example rivets or screws, which form the connection or the fastening of the carrier to the supporting bearing are arranged in such a way that the connecting elements or fastening elements are or can be subject to tensile or shear stress when the drum brake is actuated. In this way, particularly high forces can be transmitted from the supporting bearing to the carrier depending on the choice of the connecting element or fastening element.

It is furthermore advantageous if the supporting bearing is connected or fastened directly to the carrier. As a result, it is possible to dispense with additional components which would be required for an indirect connection or fastening, which additionally reduces costs.

It is furthermore advantageous if the carrier and the supporting bearing are connected to each other in a force-transmitting fashion. As a result, the supporting force which acts on the supporting bearing from the at least one brake shoe during a braking procedure of the drum brake is transmitted to the carrier.

As an alternative to the separate configuration of the carrier and the supporting bearing, it is conceivable to design the carrier and the supporting bearing as integral, which can be expedient in certain circumstances because as a result separate manufacturing processes can be avoided and manufacturing costs saved.

One of the above exemplary embodiments or a further preferred exemplary embodiment is characterized in that the carrier or an intended deformation region of the carrier has a lower stiffness than the supporting bearing and/or in that the carrier has an intended deformation region. Because the carrier or the intended deformation region has a lower stiffness than the supporting bearing, it is ensured that the carrier or the intended deformation region, the deformation of which can be determined by the deformation sensor, has a deformation during the operation of the drum brake which can be measured by the deformation sensor. In other words, it is preferred if the stiffness of the carrier and/or the intended deformation region, the supporting forces which occur, and the measuring sensitivity of the deformation sensor are coordinated with one another. At the same time, the supporting bearing can be formed so that it is sufficiently stiff for its purpose, and to be precise the transmission of the supporting force from the at least one brake shoe to the carrier. As a result, the supporting bearing can be dimensioned with particularly small dimensions. The difference between the stiffness of the carrier and the stiffness of the supporting bearing is preferably caused by the fact that the carrier is formed from a different material than the supporting bearing. As an alternative or in addition to this, it is conceivable that the lower stiffness of the carrier and/or the intended deformation region compared with the supporting bearing is implemented by a specific design, dimensioning, and/or shape of the carrier and/or the intended deformation region and/or the supporting bearing. The intended deformation region of the carrier is to be understood in particular as a region of the carrier which is to undergo an intentional deformation during the operation of the drum brake, i.e. during the braking procedure and the transmission of the supporting force by the carrier. It is particularly preferred if the intended deformation region is a region of the carrier, the deformation of which can be determined or is to be determined by the deformation sensor. For this purpose, it is particularly preferred if the intended deformation region has a lower stiffness than other regions of the carrier but at least than a further region of the carrier or one adjoining the intended deformation region. It is also preferred if the intended deformation region has a specific material weakness and/or shape for this purpose. It is also preferred if the intended deformation region and/or the carrier is designed or dimensioned in such a way that as linear as possible a deformation occurs during the operation of the drum brake, i.e. during the braking procedure and the transmission of the supporting force of the at least one brake shoe. As a result, it is ensured that the deformation of the carrier, in particular the deformation of the intended deformation region, has as linear as possible a relation with the supporting force. This contributes to a precise determination of the braking force or the braking torque from the deformation which is caused by the supporting force. A precise braking force signal and/or braking torque signal can therefore be determined or generated.

A further preferred embodiment is characterized in that the carrier has at least one material weakness. By virtue of a material weakness, it is possible to obtain a specific deformation of the carrier, for example a linear elastic deformation of the carrier, under the application of a supporting force, caused by the at least one brake shoe of the drum brake during a braking procedure of the drum brake. The material weakness is moreover preferably dimensioned in such a way that the deformation of the carrier is situated in the measuring range of the deformation sensor during a braking procedure of the drum brake. Low-priced deformation sensors can be used as a result.

A further preferred embodiment is characterized in that the at least one material weakness is designed as a recess.

It is also preferred if the recess is designed in such a way that it extends through the carrier. As an alternative to this, it is conceivable if the recess is designed in such a way that a reduction in the thickness or the strength of the carrier results. In other words, the recess in this case does not extend through the carrier.

It is furthermore advantageous if the recess is filled at least partially with a material which is different from the material of the carrier and has a lower stiffness. As a result, on the one hand, a specific deformability of the carrier is obtained and, on the other hand, protection of the carrier or a deformation sensor arranged in the recess is effected by the filling.

One of the above exemplary embodiments or a further preferred exemplary embodiment is characterized in that the carrier has a trapezoidal design. In particular, it is here an isosceles trapezium. As a result, it is possible to adapt the structural shape of the carrier optimally to the structural space conditions and/or to optimize the flow of force. The trapezoidal shape of the carrier is preferably formed in a plane within which the at least one brake shoe can be moved. A rectangular, triangular, Y-shaped, U-shaped, or T-shaped configuration of the carrier is conceivable as an alternative to the trapezoidal shape.

One of the above exemplary embodiments or a further preferred exemplary embodiment is characterized in that the trapezoidal carrier has a first and a second base side which run parallel to each other, in that the first base side is longer than the second base side, and in that the two base sides are connected to each other by two leg sides. The supporting bearing is preferably arranged on the second base side of the carrier. It is alternatively conceivable that the first base side runs at an angle to the second base side. In other words, the two base sides run obliquely relative to each other in the plane within which the two base sides run. Preferably, irrespective of the shape of the carrier, the supporting bearing has the shape of a feather key. It is alternatively expedient if the supporting bearing has the shape of a cube or a curved design. It is furthermore conceivable that two supporting bearings are provided instead of one supporting bearing. Where two supporting bearings are provided, it is preferred if each of the two supporting bearings is associated with a brake shoe, in other words serves as a supporting bearing. It is here particularly preferred if at least one of the two supporting bearings or both supporting bearings are designed as bolts or are bolt-shaped. The cross-section of the bolts is preferably circular, oval, polygonal, or flattened on one or more sides. The configuration of the supporting bearing or bearings can be applied to any shape of the carrier. In other words, the configuration of the supporting bearings or the supporting bearing is independent of the shape or configuration of the carrier.

One of the above exemplary embodiments or a further preferred exemplary embodiment is characterized in that the supporting bearing extends transversely to a plane in which the carrier extends. In other words, it is preferred if the supporting bearing extends laterally with respect to the carrier, along the plane in which the carrier is arranged.

One of the above exemplary embodiments or a further preferred exemplary embodiment is characterized in that the carrier comprises a deformation sensor carrier, wherein the deformation sensor is accommodated by the deformation sensor carrier, or in that the carrier comprises a receptacle for the deformation sensor in which the deformation sensor is accommodated. The receptacle for the deformation sensor is preferably a provided connection or fastening point of the deformation sensor at which the deformation sensor is connected or fastened, preferably directly but alternatively indirectly, to the carrier. The deformation sensor is preferably designed separately from the carrier. It is also preferred if the deformation sensor carrier is connected or fastened directly or indirectly to the carrier. It is advantageous if the deformation sensor carrier is connected or fastened to the carrier in such a way that a deformation of the carrier results in a specific deformation of the deformation sensor carrier, which is preferably linear in relation to the supporting force of the drum brake. In particular, the deformation sensor is here accommodated by the deformation sensor carrier in such a way, in other words is coupled to the deformation sensor carrier in such a way, that the deformation of the deformation sensor carrier can be measured by the deformation sensor, i.e. the deformation of the carrier can be measured indirectly by the deformation sensor. It is particularly preferred if the deformation sensor carrier is arranged in such a way that the deformation of the deformation sensor carrier is greater than the deformation of the carrier in the case of a given supporting force. In particular, the deformation sensor carrier in this design forms the intended deformation region or a further intended deformation region. Such an arrangement is expediently characterized in that the deformation sensor or the deformation sensor carrier is connected or fastened to the carrier in a form-fitting, materially bonded, and/or force-fitting fashion. It is furthermore expedient if, in the case that a deformation sensor carrier is provided, the deformation sensor is connected to the deformation sensor carrier in a form-fitting, materially bonded, and/or force-fitting fashion.

It is furthermore particularly preferred if the deformation sensor carrier and/or the deformation sensor is coupled to the carrier in such a way that a deformation, torsion, or twisting of the carrier results in tensile stress or shear stress on the deformation sensor carrier and/or the intended deformation region. It is additionally conceivable that a deformation, torsion, or twisting of the carrier results in compression of the deformation sensor carrier and/or the intended deformation region.

One of the above exemplary embodiments or a further preferred exemplary embodiment is characterized in that the deformation sensor or the deformation sensor carrier is arranged in or on the intended deformation region. This contributes to the measurement accuracy and the measurement sensitivity. The deformation sensor or the deformation sensor carrier is preferably arranged directly or indirectly on the intended deformation region.

It is furthermore expedient if the deformation sensor and/or the deformation sensor carrier and/or the intended deformation region is arranged on a side of the carrier which faces away from the supporting bearing.

It is moreover particularly preferred if the deformation sensor carrier and/or the deformation sensor bridges a recess, the recess, or one of the recesses in the carrier, in particular a material weakness, the material weakness, or one of the material weaknesses of the carrier, and/or is arranged therein. The recess is preferably a specific weakness of the carrier which preferably results in a specific deformation under load of the carrier by the supporting force.

It is moreover particularly advantageous if the deformation sensor and/or the deformation sensor carrier and/or the intended deformation region is arranged in a region of the carrier which remains as cool as possible during the operation of the drum brake because the distance from the heat source is as large as possible.

One of the above exemplary embodiments or a further preferred exemplary embodiment is characterized in that the deformation sensor is arranged spaced apart from the carrier. In other words, the deformation sensor is arranged so that it does not contact the carrier. In such a case, it is preferred if the carrier and/or the intended deformation region is magnetized. For this purpose, it is expedient if the carrier and/or the intended deformation region is formed from a ferritic metal or steel. It is moreover expedient if the deformation sensor is designed in such a way that it detects the orientation of the magnetic field of the carrier or the intended deformation region. As a result, it is possible to detect a change in the orientation of the magnetic field of the carrier or the intended deformation region by the deformation sensor, which is caused by a deformation of the carrier or the intended deformation region. Depending on the orientation or the change in the orientation of the magnetic field, it is thus possible to draw a conclusion about the deformation of the carrier and thus about the supporting force which is proportional to the braking force or the braking torque. The advantage of such a measuring arrangement consists in the fact that there is no direct mechanical contact between the carrier and the deformation sensor by which heat could be transmitted from the carrier to the deformation sensor. The carrier is namely exposed to high temperatures which are caused by the friction of the at least one brake shoe with the brake drum of the drum brake during a braking procedure of the drum brake. In other words, such a measuring arrangement contributes to the functional reliability and the durability of the deformation sensor. Alternatively, an SAW sensor can be provided which can also be arranged spaced apart from the carrier. In this embodiment, it is preferred if the intended deformation region is formed by an expansion element which is preferably formed as a metal strip. This expansion element is preferably coupled to the carrier in such a way that a deformation of the carrier results in an in particular linear deformation of the expansion element.

One of the above exemplary embodiments or a further preferred exemplary embodiment is characterized in that the carrier is arranged in such a way that a supporting force can be transmitted from the at least one brake shoe to the carrier by the supporting bearing. In other words, the supporting bearing preferably forms a force introduction point for the at least one brake shoe or in each case a force introduction point for each brake shoe. If the carrier is connected to a stub axle or a wheel carrier or is fastened to one of them, the carrier conducts the supporting force to the wheel carrier or the stub axle. In other words, the carrier forms a force path from the at least one brake shoe via the supporting bearing to the wheel carrier or the stub axle.

The object relating to the brake system is achieved by a brake system being supplied with at least one drum brake according to the invention. In this way, a brake system is created which is characterized by its particular degree of functional reliability and accuracy in terms of the determination of the braking force and/or the braking torque. At the same time, this is here an extremely simple and cost-effective structure of such a brake system. It is preferred if the brake system comprises one, two, three, four, or more than four such drum brakes.

The object relating to the vehicle is achieved by a vehicle being supplied with at least one drum brake according to the invention or with the brake system according to one aspect of the invention. It is preferably a motor vehicle which comprises in particular an electric drive.

A further aspect of the invention consists in the fact that a braking force signal or a braking torque signal can be determined or generated by the drum brake according to the invention or a brake system according to one aspect of the invention. It is moreover preferred if at least one axle of the vehicle or each axle of the vehicle features two such drum brakes.

A further aspect of the invention consists in supplying a method for operating a brake system and/or a driver assistance system using the braking force signal or the braking torque signal. The brake system is preferably the brake system according to one aspect of the invention.

A further aspect of the invention consists in supplying a method for determining the braking force or the braking torque of a drum brake, wherein the method comprises measuring the deformation of a carrier and determining the braking force or the braking torque from the measured deformation. It is preferred if the drum brake is the drum brake according to one aspect of the invention. It is moreover expedient if the deformation of the carrier is performed by a deformation sensor. The deformation sensor is preferably one of the types of the abovementioned deformation sensors of the drum brake according to the invention. It is furthermore expedient if the carrier is the carrier of the drum brake according to the invention. It is also preferred if the measurement of the deformation of the carrier is carried out at the intended deformation region of the carrier. It is furthermore advantageous if the determination of the braking force or the braking torque is carried out by an evaluation unit. It is particularly advantageous if a braking force signal or a braking torque signal is generated from the determined braking force or the determined braking torque. It is here preferably one of the abovementioned signals according to the invention.

Advantageous developments of the present invention are described in the subclaims and in the description of the figures that follows.

BRIEF DESCRIPTION OF THE DRAWINGS

The invention is explained in detail below on the basis of exemplary embodiments with reference to the drawings, in which.

DETAILED DESCRIPTION OF THE PRESENTLY PREFERRED EMBODIMENTS

Figure 1:
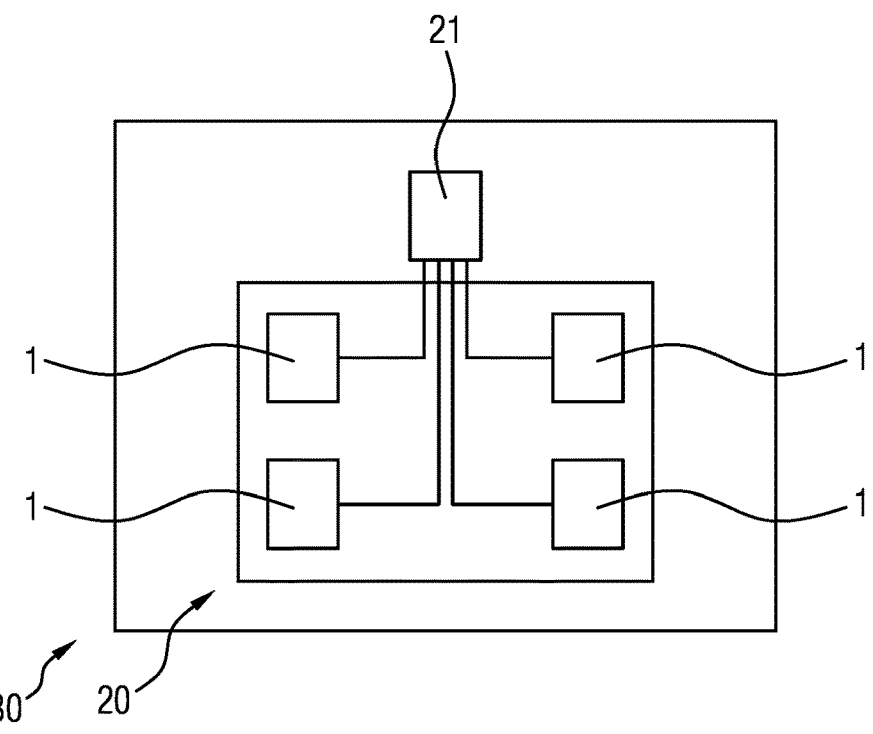
FIG. 1 is a vehicle according to the invention.

FIG. 1 shows a vehicle 30 according to the invention which takes the form of a motor vehicle with two axles and an electric drive. The vehicle 30 comprises a brake system 20 according to the invention which has four drum brakes 1 according to the invention. In each case two drum brakes 1 of the four drum brakes 1, according to one aspect of the invention, are associated with an axle of the vehicle 30. The drum brakes 1 are designed as both a service brake and a parking brake and can therefore be operated as such. The brake system 20 moreover comprises a control device 21 by which the drum brakes 1 can be operated and braking signals, such as for example braking force signals or braking torque signals, can be evaluated. The control device 21 is furthermore designed in such a way that it can operate the brake system 20 as a driver assistance system. For this purpose, it is conceivable that further signals are processed by further sensors of the vehicle 30 in the control device 21.

Figure 2:
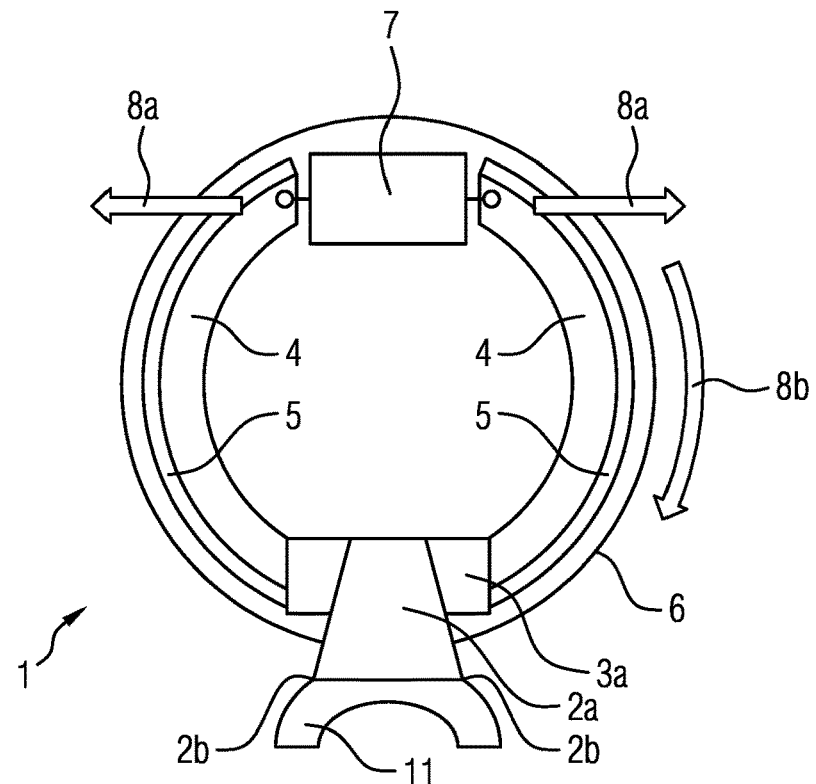
FIG. 2 is a drum brake according to the invention.

FIG. 2 shows a drum brake 1 according to one aspect of the invention from FIG. 1. The drum brake 1 comprises a carrier 2a, which is connected to a stub axle 11 via a carrier connection 2b. The two brake shoes 4 each have a brake lining 5. The brake shoes 4 can be moved in a radial direction 8a toward a brake drum 6, which can rotate in a direction of rotation 8b, by an actuator 7, which is designed as an electrical actuator such that deceleration of the brake drum occurs when the brake linings 5 contact the rotating brake drum 6. The actuator 7 can alternatively be designed as a hydraulic actuator. A supporting force, which is conducted into the carrier 2a by the brake shoes 4 via a supporting bearing 3a and is transmitted to the stub axle 11, is created by the friction between the brake linings 5 and the brake drum 6. The stub axle can be connected to a periphery which can absorb the supporting force which occurs.

Figure 3:
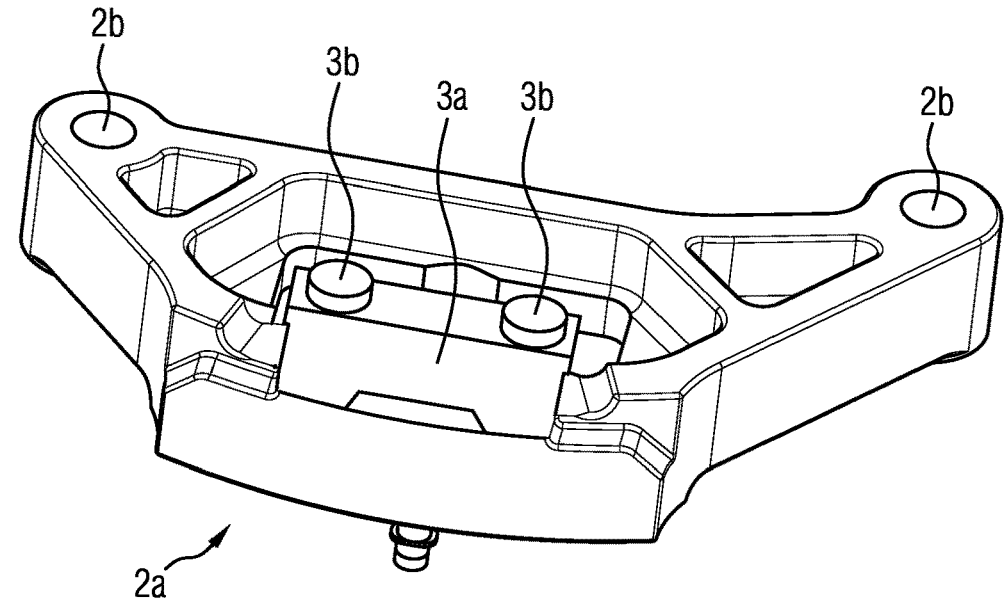
FIG. 3 is a carrier of the drum brake according to the invention.

FIG. 3 shows the carrier 2a of the drum brake from FIG. 2. Visible are the two carrier connections 2b and that the carrier 2a has the shape of a trapezium. The carrier 2a is moreover formed from metal and has weight-reducing recesses. The separately formed supporting bearing 3a, which can be connected to the carrier 2a in a force-transmitting fashion by a supporting bearing connection 3b which is designed as a screw connection 3b, can furthermore be seen. The supporting bearing 3a is also formed from metal but has a higher stiffness than the carrier 2a because of the choice of material and its shape. The carrier 2a moreover has stiffening ribs 2c between the carrier connections 2b and the fastening point between the carrier 2a and the supporting bearing 3a.

Figure 4:
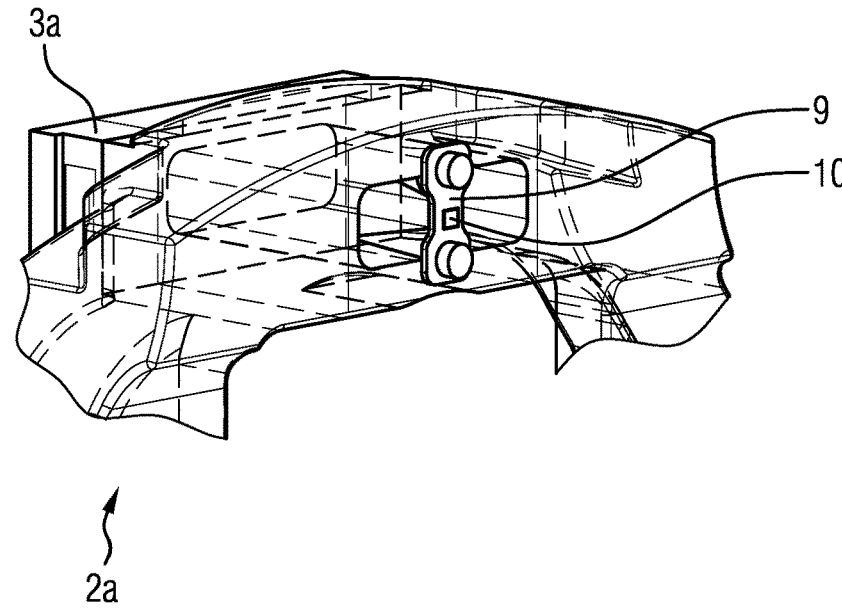
FIG. 4 is a portion of the carrier from FIG. 3.

FIG. 4 shows a portion of the carrier 2a from FIG. 3. In contrast with FIG. 3, that side of the carrier 2a which faces away from the supporting bearing 3a can be seen here. Visible is a deformation sensor carrier 9 which bridges a recess of the carrier 2a and is connected to the carrier 2a by a screw connection. A deformation sensor 10, which is designed as a piezoresistive deformation sensor 10, is accommodated on the deformation sensor carrier 9 as part of a full bridge. The full bridge with the deformation sensor 10 is arranged at an angle of 45° to the direction of extent of the deformation sensor carrier 9. As a result, deformations of the carrier 2a can be measured indirectly via the deformation of the deformation sensor carrier 9. The braking force and/or the braking torque of the drum brake can be determined by the determined deformation of the carrier 2a.

The exemplary embodiments in FIGS. 1 to 4 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drum brake, comprising:

at least one brake shoe;

a carrier connected to a supporting bearing for the at least one brake shoe; and a deformation sensor configured to determine a deformation of the carrier, wherein the carrier has a lower stiffness than the supporting bearing, and/or wherein the carrier has an intended deformation region that has a lower stiffness than the supporting bearing.

2. The drum brake as claimed in claim 1, wherein the carrier and the supporting bearing are formed separately from each other.

3. The drum brake as claimed in claim 1, wherein the carrier has at least one material weakness.

4. The drum brake as claimed in claim 3, wherein the at least one material weakness is a recess.

5. The drum brake as claimed in claim 1, wherein the carrier has a trapezoidal design.

6. The drum brake as claimed in claim 5, wherein the trapezoidal carrier has a first base side and a second base side which run parallel to each other, wherein the first base side is longer than the second base side, and wherein the two base sides are connected to each other by two leg sides.

7. The drum brake as claimed in claim 1, wherein the supporting bearing extends transversely to a plane in which the carrier extends.

8. The drum brake as claimed in claim 1, wherein one of:
the carrier comprises a deformation sensor carrier configured to accommodate the deformation sensor, or
the carrier comprises a receptacle configured to accommodate the deformation sensor.

9. The drum brake as claimed in claim 8, wherein the deformation sensor or the deformation sensor carrier is arranged in or on an intended deformation region.

10. The drum brake as claimed in claim 1, wherein the deformation sensor is arranged spaced apart from the carrier.

11. The drum brake as claimed in claim 1, wherein the carrier is arranged in such that a supporting force can be transmitted from the at least one brake shoe to the carrier by the supporting bearing.

12. A brake system comprising:
at least one drum brake, comprising:

at least one brake shoe;
a carrier connected to a supporting bearing for the at least one brake shoe; and
a deformation sensor configured to determine a deformation of the carrier,
wherein the carrier has a lower stiffness than the supporting bearing, and/or
wherein the carrier has an intended deformation region that has a lower stiffness than the supporting bearing.

13. A vehicle comprising:
at least one drum brake, comprising:
at least one brake shoe;
a carrier connected to a supporting bearing for the at least one brake shoe; and
a deformation sensor configured to determine a deformation of the carrier,
wherein the carrier has a lower stiffness than the supporting bearing, and/or
wherein the carrier has an intended deformation region that has a lower stiffness than the supporting bearing.

* * * * *